(12) United States Patent
Huber et al.

(10) Patent No.: US 11,667,320 B2
(45) Date of Patent: Jun. 6, 2023

(54) ADJUSTMENT DRIVE FOR A STEERING COLUMN, AND STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Göfis (AT); Walter Lampert, Göfis (AT); Jean-Pierre Specht, Haag (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 239 days.

(21) Appl. No.: 17/286,853

(22) PCT Filed: Nov. 11, 2019

(86) PCT No.: PCT/EP2019/080808
§ 371 (c)(1),
(2) Date: Apr. 20, 2021

(87) PCT Pub. No.: WO2020/099292
PCT Pub. Date: May 22, 2020

(65) Prior Publication Data
US 2021/0380157 A1    Dec. 9, 2021

(30) Foreign Application Priority Data

Nov. 12, 2018    (DE) ..................... 10 2018 219 264.2

(51) Int. Cl.
*B62D 1/181*    (2006.01)
*F16C 17/10*    (2006.01)
(Continued)

(52) U.S. Cl.
CPC .............. *B62D 1/181* (2013.01); *F16C 17/10* (2013.01); *F16C 33/046* (2013.01); *F16C 43/02* (2013.01);
(Continued)

(58) Field of Classification Search
CPC ..... F16H 2025/2084; F16H 2025/2031; F16H 25/20; F16C 2326/24; F16C 2229/00;
(Continued)

(56) References Cited

U.S. PATENT DOCUMENTS 4,878,394 A * 11/1989 Nakamura ............. B62D 1/181
280/775
5,265,906 A * 11/1993 Faulstroh ............... B62D 1/181
280/775
(Continued)

FOREIGN PATENT DOCUMENTS

DE    101 39 051 A    7/2002
DE    102 45 269 A    4/2004
(Continued)

OTHER PUBLICATIONS

English Translation of International Search Report issued in PCT/EP2019/080808, dated Feb. 4, 2020.

*Primary Examiner* — David M Fenstermacher
(74) *Attorney, Agent, or Firm* — thyssenkrupp North America, LLC

(57) ABSTRACT

An adjustment drive for a steering column may include a drive unit having a threaded spindle that is supported in a gearbox housing at a bearing portion so as to be rotatable, with the threaded spindle including a threaded portion with a spindle thread that is axially adjoined to a shaft portion on which a gear wheel is arranged in a rotationally secure manner. The gear wheel meshes with a drive wheel that is coupled to a motor. Between the threaded portion and the
(Continued)

gear wheel a peripheral bearing groove with a groove base may extend between groove flanks thereof. The bearing portion may be disposed in the bearing groove in a region of the groove base, and the bearing portion may be supported in a sliding manner in a bearing opening of a bearing plate that engages radially in the bearing groove.

20 Claims, 5 Drawing Sheets

(51) Int. Cl.
 *F16C 33/04* (2006.01)
 *F16C 43/02* (2006.01)
 *F16H 25/20* (2006.01)
(52) U.S. Cl.
 CPC .......... *F16H 25/20* (2013.01); *F16C 2226/70* (2013.01); *F16C 2229/00* (2013.01); *F16C 2326/24* (2013.01); *F16H 2025/209* (2013.01); *F16H 2025/2031* (2013.01); *F16H 2025/2084* (2013.01)
(58) Field of Classification Search
 CPC .... F16C 2226/70; F16C 43/02; F16C 33/046; F16C 17/10; B62D 1/181
 See application file for complete search history.

(56) References Cited

U.S. PATENT DOCUMENTS

| | | | |
|---|---|---|---|
| 5,911,789 A * | 6/1999 | Keipert | F16H 25/2006 280/775 |
| 11,235,798 B2 * | 2/2022 | Huber | F16H 25/2015 |
| 11,407,437 B2 * | 8/2022 | Huber | B62D 1/195 |
| 2002/0073790 A1 | 6/2002 | Wiesler | |
| 2005/0070365 A1 | 3/2005 | Riefe et al. | |
| 2005/0241420 A1 | 11/2005 | Oberle | |
| 2014/0157938 A1 | 6/2014 | Erhardt | |
| 2019/0016364 A1 * | 1/2019 | Palmer | B62D 1/181 |
| 2021/0129892 A1 * | 5/2021 | Ryne | B62D 1/185 |
| 2021/0269081 A1 * | 9/2021 | Huber | B62D 1/181 |
| 2021/0362768 A1 * | 11/2021 | Huber | F16H 25/2003 |
| 2021/0380157 A1 * | 12/2021 | Huber | F16H 25/20 |
| 2022/0073127 A1 * | 3/2022 | Forte | B62D 5/006 |
| 2022/0161842 A1 * | 5/2022 | Bonkowski | B62D 1/181 |
| 2022/0410962 A1 * | 12/2022 | Fevre | B62D 1/185 |
| 2023/0018690 A1 * | 1/2023 | Fevre | F16C 41/00 |

FOREIGN PATENT DOCUMENTS

| | | |
|---|---|---|
| DE | 10 2011 001 971 A | 10/2012 |
| DE | 10 2017 201 379 A | 8/2018 |
| EP | 2 166 252 A | 3/2010 |
| WO | 2004/087483 A | 10/2004 |
| WO | 2018/077793 A1 | 5/2018 |
| WO | 2018/138044 A | 8/2018 |

* cited by examiner

ADJUSTMENT DRIVE FOR A STEERING COLUMN, AND STEERING COLUMN FOR A MOTOR VEHICLE

CROSS REFERENCE TO RELATED APPLICATIONS

This application is a U.S. National Stage Entry of International Patent Application Serial Number PCT/EP2019/080808, filed Nov. 11, 2019, which claims priority to German Patent Application No. DE 10 2018 219 264.2, filed Nov. 12, 2018, the entire contents of both of which are incorporated herein by reference.

FIELD

The present disclosure generally relates to adjustment drives for steering columns of motor vehicles.

BACKGROUND

Steering columns for motor vehicles have a steering shaft having a steering spindle, to the rear end of which facing the driver, in the travel direction, a steering wheel for introducing a steering command by the driver is fitted. The steering spindle is rotatably supported about the longitudinal axis thereof in an adjustment unit, which is retained by a support unit on the vehicle body. As a result of the fact that the adjustment unit is received in a cover unit which is connected to the support unit and which is also referred to as a guide box or boxed swingarm so as to be able to be displaced in a telescope-like manner in the direction of the longitudinal axis, a longitudinal adjustment can be carried out. A height adjustment can be carried out by the adjustment unit or a cover unit which receives it being pivotably supported on the support unit. The adjustment of the adjustment unit in the longitudinal or vertical direction enables the adjustment of an ergonomically comfortable steering wheel position relative to the driver position in the operating position, also referred to as the driver or operating position, in which a manual steering intervention can be carried out.

It is known in the prior art, in order to adjust the adjustment unit relative to the support unit, to provide a motorized adjustment drive having a drive unit which comprises an electric adjustment motor which—generally by means of a gear mechanism—is connected to a spindle drive which comprises a threaded spindle which is screwed into a spindle nut. As a result of the drive unit, the threaded spindle and the spindle nut can be rotatably driven with respect to each other about an axis, that is to say, the threaded spindle axis, whereby the threaded spindle and the spindle nut can be moved toward each other or away from each other in translation depending on the rotation direction. In an embodiment which is referred to as a rotation spindle drive, the threaded spindle can be rotatably driven about the axis thereof by the drive unit which is connected in an axially fixed manner to the adjustment unit or the support unit and engages in the spindle nut which is fitted in a fixed manner to the support unit or alternatively to the adjustment unit with respect to rotation about the threaded spindle axis. Axially, the threaded spindle is supported on the support unit or the adjustment unit and the spindle nut is supported accordingly on the adjustment unit or alternatively on the support unit so that a rotational drive of the threaded spindle brings about a translational adjustment of the support unit and adjustment unit relative to each other in the direction of the threaded spindle axis.

The drive unit has a gearbox housing which is connected by means of connection means to a first portion of the steering column, for example, the cover unit, and is axially supported. The threaded spindle protrudes axially from the gearbox housing with the threaded portion thereof which is screwed with the spindle thread into a spindle nut which is fitted, in an axially supported manner, relative to the rotation about the axis securely to a second portion of the steering column which can be adjusted by the adjustment drive relative to the first portion, for example, to the support unit or the adjustment unit.

The threaded spindle has a shaft portion which is connected in an axial direction to the threaded portion. Within the gearbox housing, there is fitted to the shaft portion in a rotationally secure manner a gear wheel which has a toothing portion, for example, an externally peripheral tooth arrangement or worm gearing. A drive wheel which engages in the toothing portion, for example, a worm, is coupled directly or indirectly to the motor shaft of an electric motor which may be connected to the gearbox housing in order to form a compact drive unit. Such a drive unit is described, for example, in DE 10 2017 201 379 A1.

In order to receive the axial and transverse forces acting on the spindle drive, the threaded spindle is rotatably supported in the gearbox housing in a spindle bearing. The spindle bearing comprises at least one bearing face in a bearing portion of the threaded spindle, and at least one bearing face of the gearbox housing which corresponds thereto.

In DE 10 2017 201 379 A1, the spindle bearing comprises roller bearings in which the bearing faces are constructed as roller member raceways in the region of the shaft portion externally on the gear wheel and in a manner corresponding thereto internally in the gearbox housing. The advantage is that high forces can be readily absorbed as a result of the roller bearing. However, the construction is relatively complex and increased friction may occur in particular at high adjustment speeds.

In DE 101 39 051 A1, the threaded spindle is supported in a plain bearing in the gearbox housing. In order to receive axial forces, an additional supporting element which cooperates with the gear wheel is provided. A complex construction is thereby also produced and increased friction may occur.

Thus, a need exists for an improved adjustment drive which can be constructed in a less complex manner and which enables lower friction.

DETAILED DESCRIPTION

Figure 1:
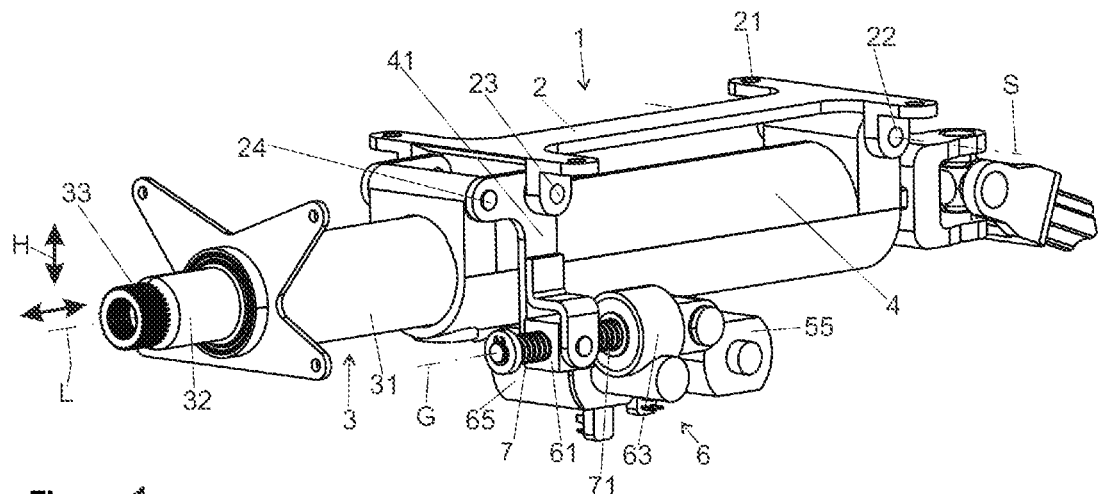
FIG. 1 is a perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to adjustment drives for steering columns of motor vehicles. In some examples, an adjustment drive may have a drive unit comprising a threaded spindle that is supported in a gearbox housing with a bearing portion so as to be able to be rotated about the axis thereof and which has a threaded portion with a spindle thread which is axially adjoined by a shaft portion, on which there is arranged in a rotationally secure manner a gear wheel which meshes with a drive wheel which is coupled to a drive motor so as to be able to be driven in rotation. The present disclosure also generally relates to steering columns that have such adjustment drives and can be adjusted in a motorized manner.

In an adjustment drive for a steering column, having a drive unit comprising a threaded spindle which is supported in a gearbox housing with a bearing portion so as to be able to be rotated about the axis thereof and which has a threaded portion having a spindle thread which is axially adjoined by a shaft portion, on which there is arranged in a rotationally secure manner a gear wheel which meshes with a drive wheel which is coupled to a motor so as to be able to be driven in rotation, it is proposed according to the invention that the shaft portion has between the threaded portion and the gear wheel a peripheral bearing groove with a groove base which extends between the groove flanks thereof, wherein in the bearing groove in the region of the groove base there is constructed the bearing portion which is supported in a sliding manner in a bearing opening of a bearing plate which engages radially in the bearing groove.

The bearing groove according to the invention forms a peripheral recess in the shaft portion. The bearing portion preferably has a cylindrical bearing face which is constructed on the peripheral base face of the bearing groove which corresponds to the groove base covering face. Consequently, the groove base extends in an axial direction, that is to say, in the direction of the axis. The axis may also be referred to as a spindle axis or threaded spindle axis. The cylindrical bearing portion extends axially between the two groove flanks which axially delimit the open groove cross section and whose axial spacing from each other defines the groove width of the bearing groove. The groove depth refers to the radial spacing between the outer periphery of the shaft portion and the bearing face which is constructed on the groove base.

Preferably, the bearing groove according to the invention is formed integrally in the shaft portion. In this instance, both groove flanks and the groove base form surfaces of the same integral shaft portion. The bearing groove can be introduced into the shaft portion with little complexity by means of a machining or non-machining processing method, for example, in an axially integrally continuous, preferably cylindrical portion of the shaft portion. An advantage of the integral construction is that no additional bearing components—as with multi-component bearing arrangements—are required to delimit the bearing groove. The complexity for production and assembly is thereby reduced.

In an alternative embodiment, the groove base may be constructed in a conical manner. Consequently, the bearing portion is a conical covering face.

An advantage is afforded in that the effective bearing diameter of the plain bearing which corresponds to the diameter of the cylindrical bearing portion inside the bearing groove on the groove base is smaller than the outer diameter of the shaft portion in which the bearing groove is introduced according to the invention. The spindle bearing formed by the bearing portion which is supported in a sliding manner in the bearing hole of the bearing plate has, as a result of the smaller bearing diameter of the bearing face, a lower bearing friction than in the adjustment drives known in the prior art. For example, the threaded spindle in the above-mentioned DE 10 2017 201 379 A1 is supported with a bearing face which is arranged on the shaft portion, which leads to a higher friction bearing than in the invention.

Another advantage of the invention is that the bearing plate engages in a radial direction between the groove flanks in the open groove cross-section and thereby produces a positive-locking connection which is effective in an axial direction between the bearing plate and threaded spindle. In other words, the threaded spindle is positioned and fixed in the direction of the axis in a positive-locking manner relative to the bearing plate. Between the bearing plate and the groove flanks there is preferably an axial play which is preferably smaller than the groove width or the thickness of the bearing plate.

The bearing plate is preferably secured to the gearbox housing, whereby the threaded spindle is retained in the gearbox housing in a radially and axially defined manner, advantageously in both axial directions. The possible axial movement of the threaded spindle relative to the bearing plate is limited by the axial play of the bearing plate between the groove flanks. An additional support element as in DE 10 2017 201 379 A1 can thereby be dispensed with.

The bearing groove is preferably introduced in the shaft portion between the threaded portion and the gear wheel. The groove width measured in an axial direction between the groove flanks is preferably smaller than the axial spacing between the threaded portion and the gear wheel.

The bearing diameter of the cylindrical bearing face is smaller than the shaft diameter of the shaft portion by double the amount of the groove depth. The shaft portion may preferably be constructed in a cylindrical manner over the length thereof, preferably with a shaft diameter which remains consistent over the shaft length.

An advantageous embodiment of the invention makes provision for the bearing diameter of the bearing portion to be less than the thread nominal diameter of the spindle thread, preferably less than or equal to the core diameter of the spindle thread. The thread nominal diameter is measured according to the definition externally on the spindle thread, the core diameter on the base of the thread turn or turns. In any case, the spindle thread cannot be moved in an axial direction through the bearing hole so that the threaded spindle is axially securely fixed by the spindle bearing according to the invention. As a result of the fact that the bearing diameter measured on the groove base is less than or equal to the core diameter, the axial supporting action is carried out in the core region without axial loading of the thread.

Preferably, the bearing plate is divided by the bearing opening. In a particularly preferred manner, the bearing plate is divided into two portions, wherein the division extends along a dividing plane, wherein the dividing plane coincides with the axis, that is to say, the axis is located in the plane. A radially divided plain bearing is thereby formed and has at least two bearing shells, preferably half-shells, which delimit the bearing opening in terms of segments. In order to assemble the bearing, the bearing shells can be inserted radially into the bearing groove until they lie against each other in the dividing plane of the bearing and receive the bearing portion in a slidingly rotational manner on the groove base in the bearing hole which is closed thereby at the peripheral side.

The axial thickness of the bearing plate in the region of the bearing opening may correspond to the groove width of the bearing groove between the groove flanks minus a predetermined axial bearing play. The axial bearing play is preferably less than the thickness of the bearing plate by means of which the maximum axial length of the bearing portion is delimited.

An axial pressure bearing may preferably be arranged between the gear-side end region of the threaded spindle, which is located at the free end of the shaft portion facing away from the threaded portion, and the gearbox housing. Preferably, such a pressure bearing is introduced between the front side of the threaded spindle and an opposing counter-face (support wall) of the gearbox housing. For example, a central toe bearing or point-like bearing may be produced by means of a bearing member which protrudes at the front end in an axially convex manner from the threaded spindle, for example, a sphere which lies in an almost point-like central bearing face against a preferably planar counter-face in the gearbox housing.

There may be provision for a pretensioning device to be actively arranged between the bearing plate and the gearbox housing, by which pretensioning device the bearing plate can be axially pretensioned against a groove flank of the bearing groove. As a result of the pretensioning device, the bearing plate is pressed against the remote groove flank of the bearing groove when viewed from the threaded portion, whereby the pretensioning force is transmitted in an axial direction to the threaded spindle. As a result of the pretensioning, axial bearing play of the bearing plate in the bearing groove is compensated for. Furthermore, as a result of the pretensioning force, the axial pressure bearing with which the threaded spindle is supported and mounted against the gearbox housing at the gear-side end of the shaft portion facing away from the gear portion is axially tensioned. Axial bearing play is thereby also compensated for at that location and a high level of smoothness with little wear is thereby also enabled.

The bearing plate may be supported in the gearbox housing in an axially floating manner. As a result of the floating support, the bearing plate is displaceably retained in an axial direction, that is to say, in the direction of the axis, so that it can be moved by the pretensioning device relative to the gearbox housing against the groove flank in order to transmit the pretensioning which is applied by the pretensioning device to the threaded spindle.

Preferably, there may be provision for the pretensioning device to have a resilient clamping element, preferably a spring element, in order to produce the pretensioning. The clamping element may, for example, be a pressure spring which acts in an axial direction which is supported in a pretensioned manner against the gearbox housing and which applies the resilient force as a pretensioning force to the bearing plate. Preferably, the pretensioning device may comprise a resilient element for providing the pretensioning force which is, for example, constructed as an ondular washer, plate spring, helical spring or as an O-ring which is formed from elastomer material.

There may be provision for the pretensioning device to have a wedge element which converges in a wedge-like manner transversely relative to the axis and which can be introduced in a radial direction between the bearing plate and a support face of the gearbox housing which is inclined relative to the axis. As a result of the fact that the wedge element is inserted radially, that is to say, transversely relative to the axis, in the direction of the wedge faces thereof which converge together in a wedge-like manner, wherein they are supported axially against the support face and the bearing plate, the pretensioning force can be produced on the bearing plate. An advantage of the wedge gear mechanism which is formed in this manner is that, as a result of the wedge angle, a force transmission between the actuation force which is applied radially to the wedge and the pretensioning force which is applied therefrom via the wedge faces can be predetermined. The shallower the wedge angle, the higher the resulting axial pretensioning force is for a given radial actuation force. Another advantage is that a flat wedge element acts in a self-locking manner, that is to say, is securely clamped in the adjusted position and is also not released at a high pretensioning force and is not moved radially outward out of the adjusted radial position thereof.

The wedge element may be pretensioned by a resilient element, for example, a resilient element which is supported on the gearbox housing, for example, a pressure spring, applying the resilient force as an actuation force in a radial direction to the wedge element.

As a result of the force transmission ratio as a result of the wedge action, a relatively small spring is sufficient to produce a sufficiently large pretensioning force on the bearing plate.

Preferably, there may be provision for the wedge element to be constructed in a U-shaped manner and to have two members which engage around the threaded spindle, that is to say, extend at both sides of the axis. The two members extend with spacing from each other from a connection portion in the wedge direction, in which the wedge faces converge, whereby a fork-like or curved form is produced. The shaft portion extends between and through the two members so that, as a result of the two members at opposing sides with respect to the axis, the pretensioning force is applied to the bearing plate. As a result, the pretensioning force is introduced in a uniform manner and an impairment of the function as a result of wedging of the bearing plate as a result of single-sided loading is substantially excluded.

In order to produce a resilient pretensioning force, a resilient element may be arranged radially between the gearbox housing and the connection portion which connects the members, whereby an actuation force is applied to the wedge element in the direction of the members.

The pretensioning device may be arranged between the threaded portion and the gear wheel, preferably between the threaded portion and the bearing groove. A functionally reliable, compact construction type is thereby enabled.

The invention further comprises a steering column which can be adjusted in a motorized manner for a motor vehicle, having a support unit which can be fitted to a vehicle body and by means of which there is retained an adjustment unit in which a steering spindle is rotatably supported about a longitudinal axis, and having an adjustment drive which is connected to the support unit and to the adjustment unit, and by means of which the adjustment unit can be adjusted relative to the support unit, wherein the adjustment drive has a drive unit, comprising a threaded spindle which is supported with a bearing portion so as to be able to be rotated about the axis thereof in a gearbox housing, and which has a threaded portion which engages in a spindle groove and which has a spindle thread which is axially adjoined by a shaft portion on which there is arranged in a rotationally secure manner a gear wheel which meshes with a drive wheel which is coupled to a drive motor so as to be able to be driven in rotation, wherein the adjustment drive is constructed in accordance with at least one of the embodiments according to the invention as explained above.

FIG. 1 is a schematic, perspective view of a steering column 1 according to the invention when viewed obliquely from the top right in the direction toward the rear end with respect to the travel direction of a vehicle which is not illustrated, where a steering wheel which is not illustrated here is retained in the operating region.

The steering column 1 comprises a support unit 2, which is constructed as a console and which has securing means 21 in the form of securing holes, for fitting to a vehicle body which is not illustrated. An adjustment unit 3 which is received in a covering unit 4—also referred to as a guide box or boxed swingarm—is retained by the support unit 2.

The adjustment unit 3 has a covering pipe 31 in which a steering spindle 32 is rotatably supported about a longitudinal axis L, which extends axially in the longitudinal direction, that is to say, in the direction of the longitudinal axis L. At the rear end, there is constructed on the steering spindle 32 a securing portion 33 to which a steering wheel which is not illustrated can be fitted.

In order to carry out a longitudinal adjustment in the covering unit 4 in the direction of the longitudinal axis L, the adjustment unit 3 is received so as to be able to be displaced in a telescope-like manner in order to be able to position the steering wheel which is connected to the steering spindle 32 forward and backward in a longitudinal direction relative to the support unit 2, as indicated by the double-headed arrow parallel with the longitudinal axis L.

The covering unit 4 is pivotably supported in a pivot bearing 22 on the support unit 2 about a horizontal pivot axis S which is located transversely relative to the longitudinal axis L. In the rear region, the covering unit 4 is connected to the support unit 2 by means of an adjustment lever 41. As a result of a rotational movement of the adjustment lever 41 by means of an adjustment drive 6, the covering unit 4 can be pivoted relative to the support unit 2 about the pivot axis S which is located horizontally in the installation state, whereby an adjustment of a steering wheel which is fitted to the securing portion 33 can be carried out in the vertical direction H, which is indicated with the double-headed arrow.

Figure 2:
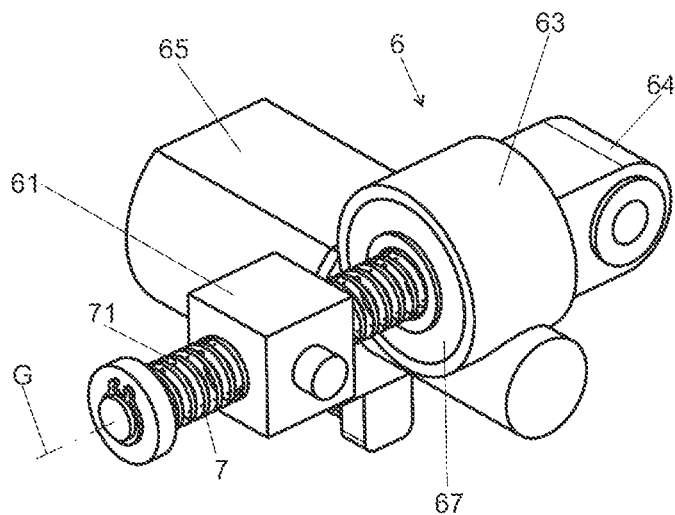
FIG. 2 is a perspective view of an example adjustment drive of a steering column according to FIG. 1.

The adjustment drive 6 which is for adjustment in the vertical direction H and which is shown as an enlarged, exposed perspective view in FIG. 2, is constructed according to the invention and comprises a threaded spindle 7 which is rotatably supported about the axis G, the spindle axis thereof, in a gearbox housing 63. The gearbox housing 63 has in the gear-side end region thereof a securing means 64 for fitting the adjustment drive 6 to the covering unit 4 in an axially supported manner.

Figure 3:
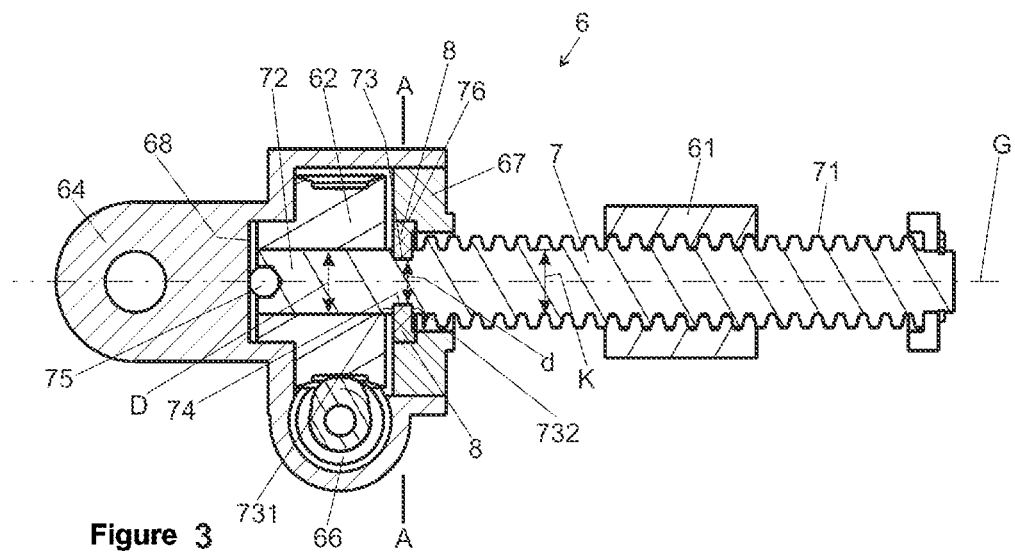
FIG. 3 is a longitudinal sectional view in a direction of a spindle axis through the adjustment drive according to FIG. 2.

FIG. 3 is a longitudinal section along the axis G. The threaded spindle 7 has a threaded portion 71 which protrudes axially from the gearbox housing 63 at the spindle side. The threaded portion 71 is screwed into a spindle nut 61 which is fitted with respect to a rotation about the axis G in a fixed manner to an end of the two-armed adjustment lever 41 which is rotatably supported about a pivot bearing 23 on the support unit 2 and the other arm of which is pivotably connected in a bearing 24 with the other end to the covering unit 4.

At the gear side, the threaded spindle 7 has a cylindrical shaft portion 72. On the shaft portion 72, there is secured in a rotationally secure manner a gear wheel 62 which may be constructed as a worm gear and which may be injected with a plastics material injection-molding operation on the threaded spindle 7 which is preferably produced from steel. However, other connection techniques are also conceivable and possible, such as, for example, a non-positive-locking connection.

There is fitted to the gearbox housing 63 an electric motor (actuation motor) 65, to the rotatably drivable motor shaft of which there is secured a worm 66 which engages in the worm gearing of the gear wheel 62.

By rotating the threaded spindle 7—depending on the rotation direction of the motor 65—the spindle nut 61 can be displaced in the direction of the axis G in translation relative to the threaded spindle 7 so that accordingly the covering unit 4 which is connected to the spindle nut 61 via the adjustment lever 41 together with the adjustment device 3 which is received therein can be adjusted upward or downward in the vertical direction H relative to the support unit 2, as indicated by the double-headed arrow. The bearing according to the invention of the threaded spindle 7 is explained below in greater detail.

Between the threaded portion 71 and the shaft portion 72, the threaded spindle has a bearing groove 73 on the groove base of which a cylindrical bearing portion 74 is constructed with a bearing diameter d which is smaller than the shaft diameter D of the shaft portion 72 and which is preferably also smaller than the core diameter K of the threaded portion 71 so that the bearing diameter d is also smaller than the thread nominal diameter.

As in the illustrated embodiment, the bearing groove 73 is preferably formed integrally in the integral shaft portion 72, for example, by means of a machining processing operation, such as turning or milling, or alternatively or additionally by means of a non-machining shaping operation. The inner groove flanks 731 and 732 and also the groove base are formed by surfaces of the same integral shaft portion 72.

Figure 4:
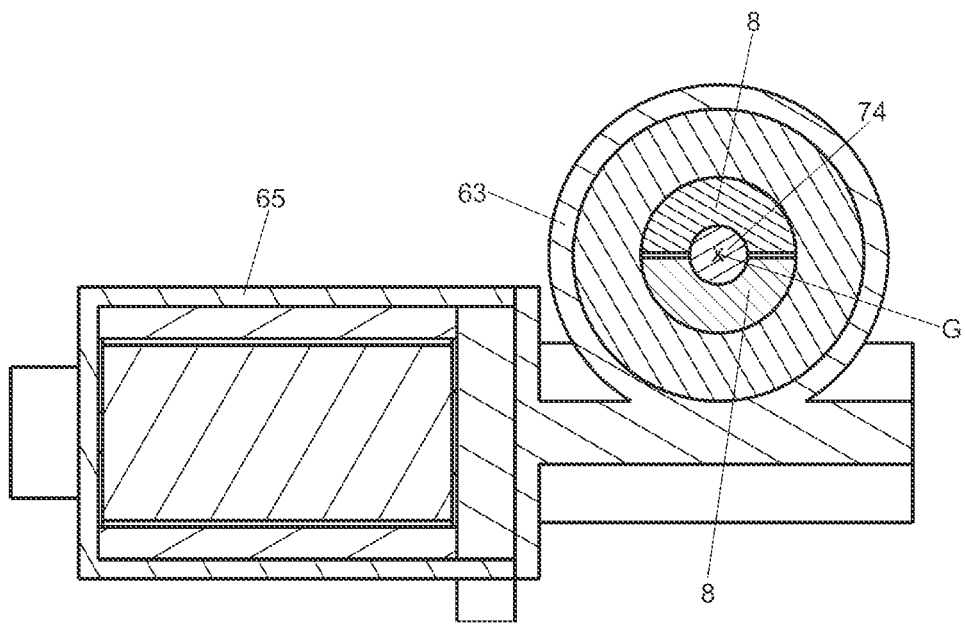
FIG. 4 is a cross sectional view taken across line A-A transversely relative to a spindle axis through the adjustment drive according to FIG. 3.

The bearing portion 74 is supported in a sliding manner in a bearing hole, which can also be referred to as a bearing opening or bearing recess, in a bearing wall which is divided transversely and which is formed by means of two bearing shells 8 which are each constructed as half-shells, with respect to rotation about the axis G. The sliding bearing which is divided transversely in this manner in the axis G can be clearly seen in the cross-section A-A from FIG. 3 as shown in FIG. 4. The separation plane between the bearing shells 8 extends transversely relative to the axis G.

The terms "bearing shells" and "bearing plates" are used synonymously with each other and consequently have the same meaning.

The bearing shells 8 protrude radially into the bearing groove 73. The axial thickness of the bearing shells 8 is less than the width of the bearing groove 73 by a predetermined axial play, measured in an axial direction internally between the inner groove flanks 731 and 732 thereof.

In the embodiment shown in FIG. 3, the bearing shells 8 are received in a bearing cover 67 and axially supported at the spindle side, that is to say, externally when viewed from the gearbox housing 63.

At the gear-side end of the shaft portion 72 facing away from the threaded portion 71, there is fitted centrally on the axis G a bearing ball 75 which protrudes in a convex manner at the front and which is axially supported in a central bearing region in a virtually point-like manner with respect to a gear-side axial counter-face 68 in the gearbox housing 63. A low-friction pressure bearing of the threaded spindle 7 is thereby formed in the gearbox housing 63.

As a result of the fact that the bearing cover 67 can be screwed into the gearbox housing 3 with an outer thread which is coaxial relative to the axis G, there can be applied via the bearing shells 8 and the gear-side groove flank 731 of the bearing groove 73 an axial pretensioning force, by means of which the bearing ball 75 is axially pressed against the bearing face 68. The bearing arrangement of the threaded spindle 7 formed from the bearing ball 75 together with the counter-face 68 and the bearing groove 73 together with the bearing shells 8 can thereby be adjusted in an axially play-free manner. The bearing cover 67 forms in this manner a pretensioning device which is actively arranged between the bearing plate formed by the bearing shells 8 and the gearbox housing 63 and by means of which the bearing plate can be axially pretensioned against one groove flank 731 of the bearing groove 73.

Figure 5:
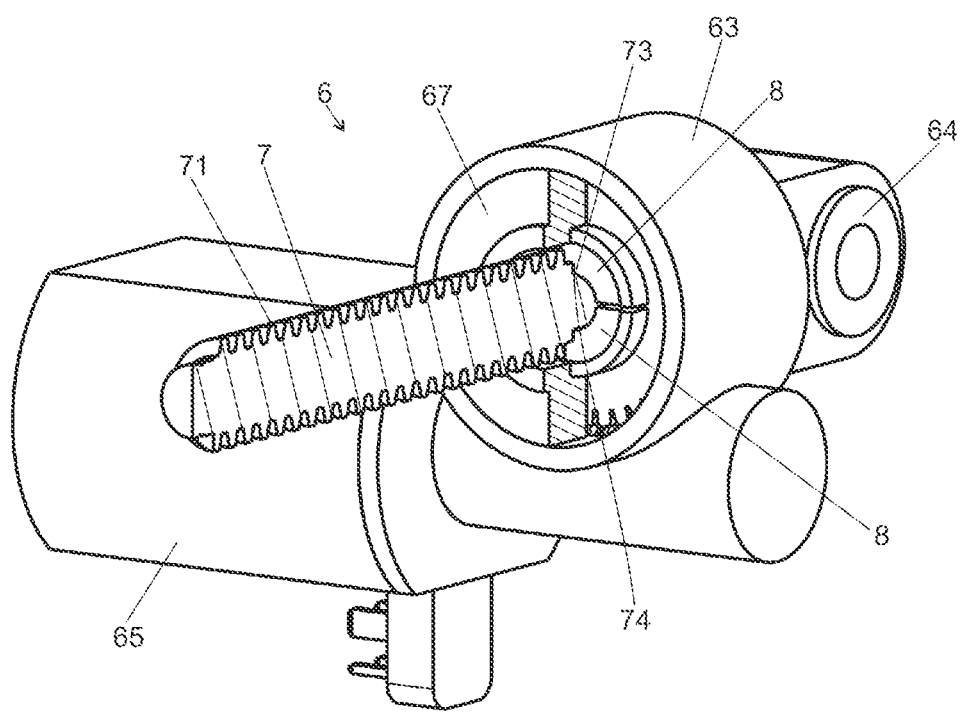
FIG. 5 is a partial cut-away perspective view of the adjustment drive according to FIGS. 2 to 4.

The arrangement of the embodiment according to FIG. 3 is illustrated once again as a perspective view in the part-section of FIG. 5.

Figure 6:
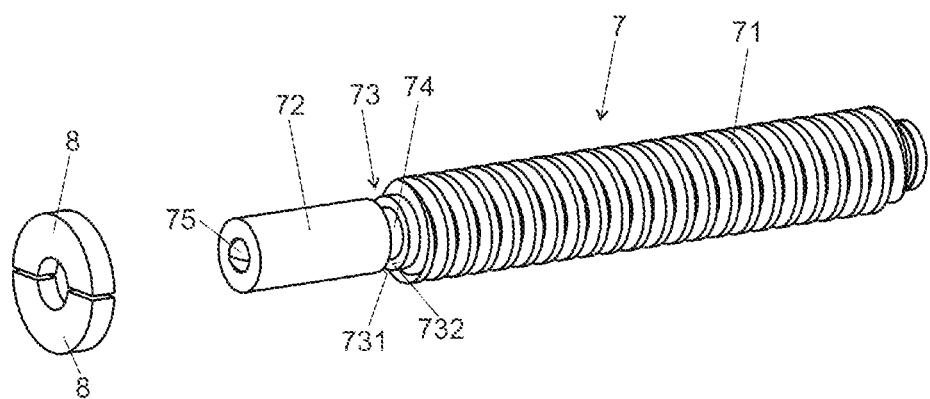
FIG. 6 is a detailed perspective view of a threaded spindle and a bearing plate of the adjustment drive according to FIGS. 2 to 5.

FIG. 6 shows the threaded spindle 7 and the bearing shells 8 in a separated, exploded illustration, from which the individual function regions can be clearly seen.

Figure 7:
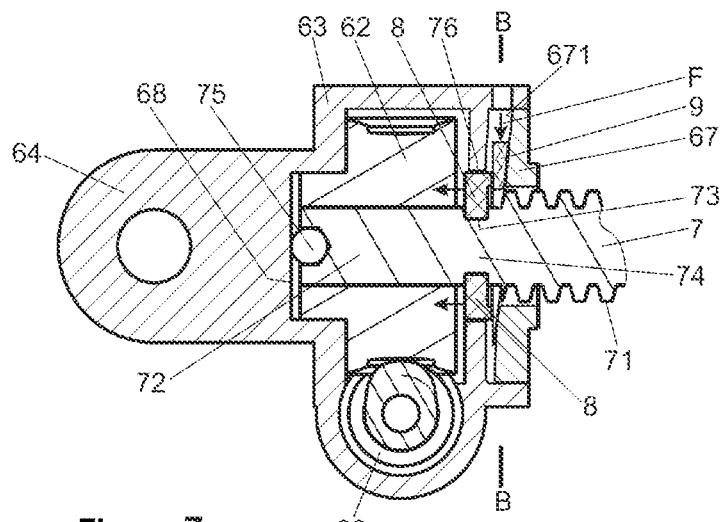
FIG. 7 is an enlarged detail view of another example adjustment drive.

FIG. 7 shows another embodiment of a drive unit, in which the bearing plate formed by the two bearing shells 8 is supported in an axially floating manner in an opening 76 of the gearbox housing 63, that is to say, can be moved axially in the direction toward the gearbox housing 63, as indicated in FIG. 7 with the arrows.

Figure 8:
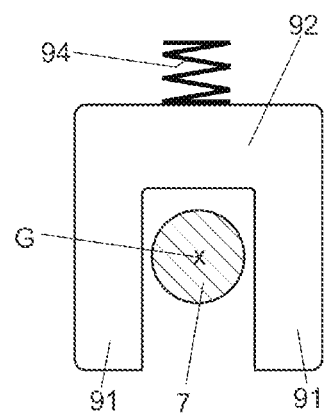
FIG. 8 is a sectional view taken across line B-B of the adjustment drive according to FIG. 7 or FIG. 9.

Between the bearing cover 67 and the bearing shells 8, there is inserted a wedge element 9 which is illustrated in FIG. 8 as a view in the direction of the axis G, as arranged in a section B-B in the gearbox housing 63. The wedge element 9 is constructed in a U-shaped manner, with two members 91 which extend with spacing from each other from a connection portion 92. When viewed from the connection portion 92, the thickness of the members 91 measured in the direction of the axis G decreases so that they converge in a wedge-like manner—in FIGS. 7 and 9 from top to bottom. As can be seen in FIG. 8, the fork-like or curved wedge element 9 engages around the threaded spindle 7 with the members 91 thereof.

Internally in the region of the bearing cover 67, the gearbox housing 63 has a wedge face 671 which is obliquely inclined with respect to the axis G approximately at the wedge angle of the wedge element 9. The members 91 are supported axially with the wedge-like outer faces thereof at the spindle side against the wedge face 671 of the bearing cover 67 and at the gear side against the two bearing shells 8.

Figure 9:
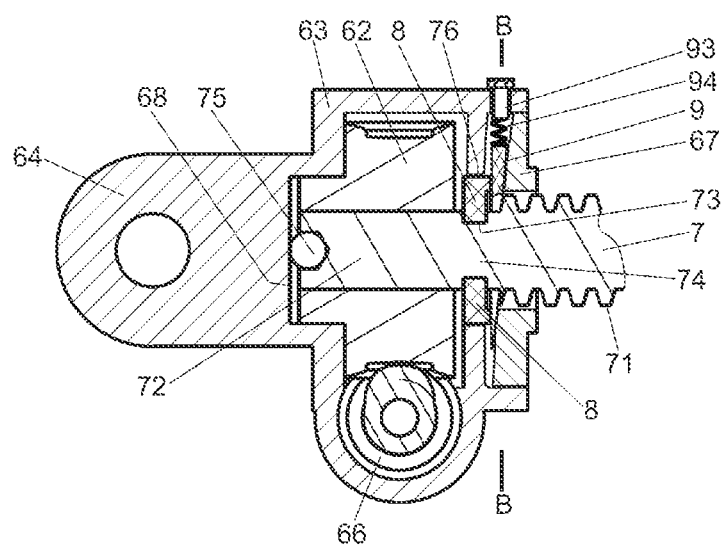
FIG. 9 is an enlarged detail view of still another example adjustment drive.

In order to adjust the pretensioning force, the wedge element 9 can be loaded relative to the gearbox housing 63 radially, from the connection portion 92 in the direction of the members 91 transversely relative to the axis G with an adjustment force F, as indicated in FIGS. 7, 8 and 9. To this end, as shown in FIG. 9, an adjustment screw 93 can be screwed into the gearbox housing 63, whereby the wedge element 9 is displaced radially, that is to say, transversely relative to the axis G. As a result of the wedge effect, the members 91 apply an axial pretensioning to the bearing shells 8. They transmit the pretensioning via the bearing groove 73 to the threaded spindle 7, whereby the bearing in the gearbox housing 63 can be tensioned in a play-free manner.

A resilient element 94, for example, a pressure spring, may be inserted between the gearbox housing 63 and the wedge element 9 or between the adjustment screw 93 and the wedge element 9, as shown in FIG. 9. This spring forms a resilient clamping element, which produces and maintains the pretensioning applied to the bearing shells 8 by means of resilient force F.

In addition, a resilient element, such as, for example, a plate spring, a helical spring, ondular washer or an O-ring formed from an elastomer material, may be arranged between the bearing cover 67 and the wedge element 9.

Alternatively, in place of the wedge element 9 between the bearing cover 67 and the bearing shells, a resilient element for pretensioning the bearing shells 8 in the direction of the axis G may be provided, such as, for example, a plate spring, helical spring, ondular washer or an O-ring formed from an elastomer material.

Figure 10:
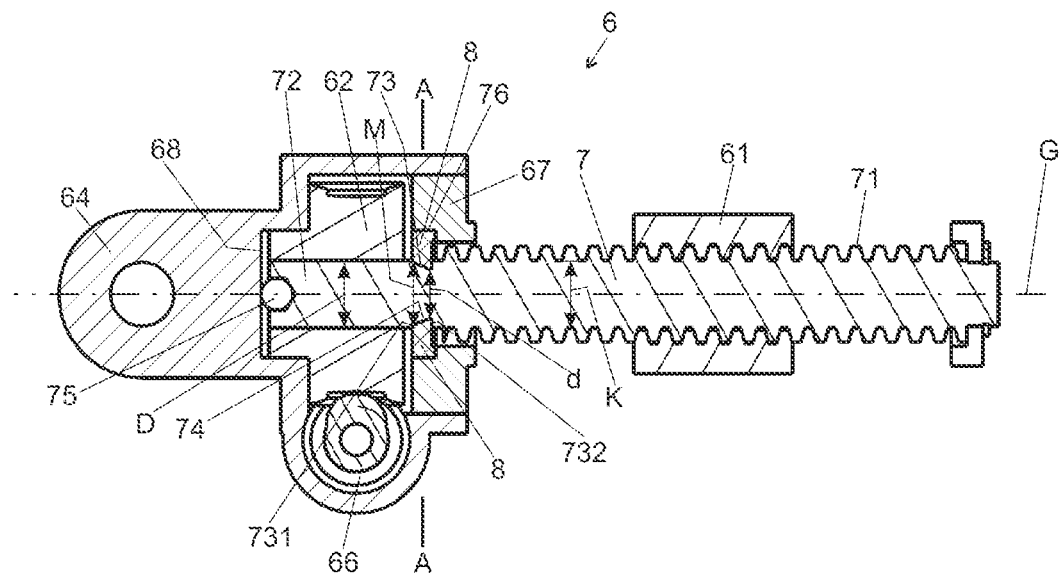
FIG. 10 is a longitudinal sectional view taken along a spindle axis through yet another example adjustment drive.

FIG. 10 shows a longitudinal section along the spindle axis (G) through an adjustment drive in a fourth embodiment similar to FIG. 3. In this instance, only the bearing groove 73 and the bearing shells 8 are constructed differently from FIG. 3.

Between the threaded portion 71 and the shaft portion 72, the threaded spindle 7 has a bearing groove 73 on the groove base of which a conical bearing portion 74 with a minimum bearing diameter d and a maximum bearing diameter M is constructed. In this instance, the minimum bearing diameter d is preferably constructed on the flank 732 facing the threaded portion 71. In other words, the bearing groove 73 converges in the direction toward the threaded portion 71, preferably in a conical manner, that is to say, the groove base tapers in the direction toward the threaded portion 71. Consequently, the groove base of the bearing groove 73 preferably has a conical covering face which at least partially acts as a bearing face.

The minimum bearing diameter d is preferably less than the shaft diameter D of the shaft portion 72, and which is preferably also less than the core diameter K of the threaded portion 71 so that the minimum bearing diameter d is also less than the thread nominal diameter.

The maximum bearing diameter D is preferably less than or equal to the shaft diameter D of the shaft portion 72, and which is preferably less than or equal to the core diameter K of the threaded portion 71 so that the maximum bearing diameter M is also less than the thread nominal diameter.

The bearing portion 74 is supported in a sliding manner in a bearing hole, which can also be referred to as a bearing opening or bearing recess, in a transversely divided bearing plate or wall which is formed by two bearing shells 8 which are each constructed as half-shells, with respect to rotation about the axis G. In accordance with the groove base, the bearing hole of the bearing shells 8 is also constructed in a correspondingly conical manner.

The bearing shells 8 protrude radially into the bearing groove 73. The axial thickness of the bearing shells 8 is smaller than the width of the bearing groove 73 by a predetermined axial play measured in an axial direction internally between the inner groove flanks 731 and 732 thereof.

As a result of this development, the axial pretensioning of the threaded spindle in the housing 63 can be further improved. Furthermore, the conical bearing portion 74 of the groove can be combined with a wedge element 9 as in the embodiments of FIGS. 7 to 9. It is thereby possible to achieve a further improvement or increase of the axial pretensioning force.

Figure 11:
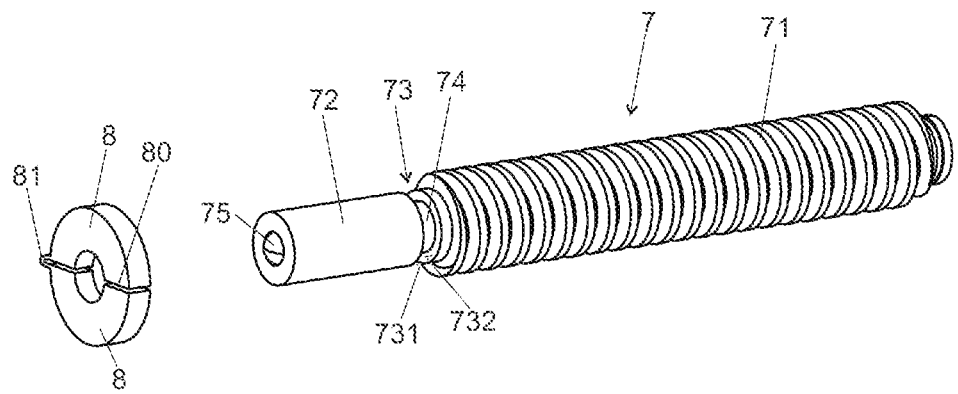
FIG. 11 is a detailed perspective view of another example threaded spindle and bearing plates.

FIG. 11 shows a detailed, perspective view of the threaded spindle 7 and the bearing plates 8 similarly to the embodiment according to FIG. 6, wherein the bearing plates 8 are constructed in an alternative embodiment. In this instance, the bearing plates 8, which are separated by means of a gap 80, are connected to each other by means of a coupling portion 81, wherein this coupling portion 81 is constructed in a resilient manner so that the bearing plates 8 can be moved apart for assembly in the bearing groove 73. Preferably, the coupling portion 81 is constructed as a film hinge. The bearing plates 8 and the coupling portion 81 are preferably constructed as a single-piece integral component, in a particularly preferred manner as a plastics material injection-molded component.

The connection of the bearing plates 8 by means of the coupling portion 81 can also be carried out without constructive or structural adaptation in the arrangements of the other embodiments since this is independent of the pretensioning device of the bearing plates 8, such as, for example, the use of the wedge element 9.

LIST OF REFERENCE NUMERALS

1 Steering column
2 Support unit
21 Securing means
22, 23 Pivot bearing
24 Bearing
3 Adjustment unit
31 Covering pipe
32 Steering spindle
33 Securing portion
34 Transmission element
4 Covering unit
41 Adjustment lever
5, 6 Adjustment drive
61 Spindle nut
62 Gear wheel
63 Gearbox housing
64 Securing means
65 Motor
66 Worm
67 Bearing cover
671 Wedge face
7 Threaded spindle
71 Threaded portion
72 Shaft portion
73 Bearing groove
731 Groove flank
732 Groove flank
74 Bearing portion
75 Bearing ball
76 Opening
8 Bearing shells
9 Wedge element
91 Member
92 Connection portion
93 Adjustment screw
94 Resilient element
L Longitudinal axis
H Vertical direction
F Adjustment force
G Axis (threaded spindle axis)

What is claimed is:

1. An adjustment drive for a steering column of a motor vehicle, the adjustment drive comprising a drive unit that includes:
    a threaded spindle that is supported at a bearing portion in a gearbox housing, the threaded spindle being rotatable about an axis of the threaded spindle, wherein the threaded spindle includes a threaded portion with a spindle thread that is axially adjoined by a shaft portion; and
    a gear wheel disposed in a rotationally secure manner on the shaft portion of the threaded spindle, wherein the gearwheel meshes with a drive wheel that is coupled to a motor such that the shaft portion is configured to be rotatably driven,
    wherein a peripheral bearing groove is disposed between the threaded portion and the gear wheel, the peripheral bearing groove having a groove base that extends between groove flanks of the peripheral bearing groove, wherein the bearing portion of the threaded spindle is disposed in the peripheral bearing groove in a region of the groove base, with the bearing portion being supported in a sliding manner in a bearing opening of a bearing plate that engages radially in the peripheral bearing groove.

2. The adjustment drive of claim 1 wherein a bearing diameter of the bearing portion is less than a thread nominal diameter of the spindle thread.

3. The adjustment drive of claim 1 wherein the bearing plate is divided by the bearing opening.

4. The adjustment drive of claim 1 wherein an axial thickness of the bearing plate in the region of the bearing opening corresponds to a groove width of the peripheral bearing groove between the groove flanks minus a predetermined axial bearing play.

5. The adjustment drive of claim 1 comprising a pretensioning device that is operatively disposed between the bearing plate and the gearbox housing, wherein via the pretensioning device the bearing plate is configured to be axially pretensioned against one of the groove flanks of the peripheral bearing groove.

6. The adjustment drive of claim 5 wherein the bearing plate is supported in the gearbox housing in an axially floating manner.

7. The adjustment drive of claim 5 wherein the pretensioning device includes a resilient clamping element.

8. The adjustment drive of claim 5 wherein the pretensioning device is disposed between the threaded portion and the gear wheel.

9. The adjustment drive of claim 5 wherein the pretensioning device includes a wedge element that converges in a wedge-like manner transversely relative to the axis of the threaded spindle, wherein the wedge element is configured to be introduced in a radial direction between the bearing plate and a support face of the gearbox housing that is inclined relative to the axis of the threaded spindle.

10. The adjustment drive of claim 9 wherein the wedge element is U-shaped and includes two members that engage around the threaded spindle.

11. A steering column that is adjustable in a motorized manner for a motor vehicle, the steering column comprising:
a support unit that is attachable to a vehicle body, wherein the support unit retains an adjustment unit in which a steering spindle is rotatably supported about a longitudinal axis; and
an adjustment drive that is connected to the support unit and to the adjustment unit, wherein the adjustment drive is configured to adjust the adjustment unit relative to the support unit, wherein the adjustment drive includes a drive unit that includes:
a threaded spindle that is supported at a bearing portion so as to be rotatable about an axis of the threaded spindle in a gearbox housing, the threaded spindle having a threaded portion that engages in a spindle groove and has a spindle thread that is axially adjoined by a shaft portion, wherein a gear wheel is disposed on the shaft portion in a rotationally secure manner, wherein the gear wheel meshes with a drive wheel that is coupled to a drive motor for rotatably driving the gear wheel and the shaft portion,
wherein a peripheral bearing groove is disposed between the threaded portion and the gear wheel, the peripheral bearing groove having a groove base that extends between groove flanks of the peripheral bearing groove, wherein the bearing portion of the threaded spindle is disposed in the peripheral bearing groove in a region of the groove base, with the bearing portion being supported in a sliding manner in a bearing opening of a bearing plate that engages radially in the peripheral bearing groove.

12. An adjustment drive with a drive unit comprising:
a gearbox housing;
a bearing plate with a bearing opening;
a threaded spindle rotatably supported in the gearbox housing at a bearing portion, the threaded spindle including a threaded portion and a shaft portion, wherein the threaded spindle includes a peripheral bearing groove between the shaft portion and the threaded portion, with the bearing portion being disposed at a groove base of the peripheral bearing groove, wherein the bearing portion is supported in a sliding manner in the bearing opening of the bearing plate, which bearing plate engages radially in the peripheral bearing groove; and
a gear wheel attached to the shaft portion of the threaded spindle, wherein the gear wheel is configured to be rotatably driven by a drive wheel.

13. The adjustment drive of claim 12 wherein a bearing diameter of the bearing portion is less than a thread nominal diameter of threads on the threaded portion of the threaded spindle.

14. The adjustment drive of claim 12 wherein an axial thickness of the bearing plate in a region of the bearing opening corresponds to a groove width of the peripheral bearing groove less a predetermined axial bearing play.

15. The adjustment drive of claim 12 wherein the bearing plate is supported in the gearbox housing in an axially floating manner.

16. The adjustment drive of claim 12 comprising a pretensioning device that is operatively disposed between the bearing plate and the gearbox housing, wherein via the pretensioning device the bearing plate is configured to be axially pretensioned against a groove flank of the peripheral bearing groove.

17. The adjustment drive of claim 16 wherein the pretensioning device includes a resilient clamping element.

18. The adjustment drive of claim 16 wherein the pretensioning device is disposed between the threaded portion and the gear wheel.

19. The adjustment drive of claim 16 wherein the pretensioning device includes a wedge element that converges in a wedge-like manner transversely relative to an axis of the threaded spindle, wherein the wedge element is configured to be introduced in a radial direction between the bearing plate and a support face of the gearbox housing that is inclined relative to the axis of the threaded spindle.

20. The adjustment drive of claim 19 wherein the wedge element is U-shaped and includes two members that engage around the threaded spindle.

\* \* \* \* \*